Patented Nov. 26, 1935

2,022,244

UNITED STATES PATENT OFFICE 2,022,244

SYNTHESIS OF ORGANIC ALIPHATIC ACIDS

Alfred T. Larson, Wilmington, Del., assignor to E. I. du Pont de Nemours & Company, Wilmington, Del., a corporation of Delaware No Drawing. Application August 18, 1933,
Serial No. 685,741

15 Claims. (Cl. 260—116)

This invention relates to the synthesis of organic compounds and more particularly to the preparation of aliphatic organic acids by the interaction in the liquid phase of olefinic hydrocarbons, carbon monoxide and water.

In the U. S. Patent of Gilbert B. Carpenter No. 1,924,766, a vapor phase process is described for the preparation of aliphatic carboxylic acids of the higher order by the reaction of steam, carbon monoxide, and an olefinic hydrocarbon, i. e. an aliphatic hydrocarbon containing a double bond,—for example, the olefines, ethylene, propylene, butylene, etc., the diolefines such as isoprene and butadiene, etc.,—the synthesis producing from these olefines acids containing generally one more carbon atom than the olefinic hydrocarbon reacted.

An object of the present invention is to provide a process for the preparation of aliphatic carboxylic acids in the liquid phase from olefinic hydrocarbons, carbon monoxide and water. A further object of this invention is to provide a liquid phase process for the preparation of monocarboxylic acids from water, carbon monoxide, and an olefine in the presence of a catalyst adapted to this synthesis. Another object of the invention is to provide a liquid phase process for the preparation of acids from the olefinic hydrocarbons indicated above and their equivalents by reacting them with carbon monoxide and water. Other objects and advantages will hereinafter appear.

I have found that the aliphatic acids of the higher order can be produced by interacting an olefinic hydrocarbon, carbon monoxide, and water, the olefinic hydrocarbons referred to above and their equivalents may be employed and generally may be represented generically by the formula $RR_1C=CR_2R_3$—wherein R, $R_1$, $R_2$, and $R_3$ represent hydrogen (H) or an alkyl radical. The acid-forming reaction of the unsaturated hydrocarbons with water and carbon monoxide apparently proceeds in accordance with the equation:

$$RR_1C=CR_2R_3+H_2O+CO=CHRR_1CR_2R_3COOH$$

that ethylene, for example, reacts with water and carbon monoxide to form propionic acid:

$$C_2H_4+H_2O+CO=CH_3CH_2COOH;$$

propylene and butylene similarly yield butyric and valeric acid, respectively.

Raw materials suitable for use in the process are readily available from a number of sources. Thus, ethylene and various homologues thereof are found in the gases evolved from cracked petroleum and may be separated therefrom, for example, by fractionational liquefaction. It is preferable, for the sake of avoiding undesirable by-products, that the hydrocarbon which it is desired to convert be employed in a relatively high degree of purity.

The carbon monoxide required for the synthesis may be derived conveniently from various commercial sources, such as, for example, water gas, producer gas, etc., by liquefaction or by other methods, and should be likewise, for the best results, relatively pure.

Generally speaking, my liquid phase synthesis of the higher aliphatic acids is effected by injecting the olefinic hydrocarbon and a carbon monoxide into an aqueous solution containing a suitable catalyst. The reaction preferably is conducted under elevated temperature and pressure. An intimate contact between the unsaturated hydrocarbons, the carbon monoxide, water, and the contained catalyst is essential for most efficient operation. It is of advantage, therefore, to employ aqueous solutions which are relatively good solvents for the unsaturated hydrocarbons and the carbon monoxide. For this reason, ammoniacal or acid copper liquor solutions may be used, e. g. cuprous chloride solutions and equivalent aqueous solutions or any suitable absorbent of the olefinic hydrocarbons and carbon monoxide, such, for example, as cuprous ammonium formate, cuprous phosphate, cuprous sulfate, mercury salts, etc. or any organic or inorganic aqueous salt solution which will dissolve those gases or which, as many of these salts do, form a complex with the olefine and carbon monoxide. Without the aid of such solutions the yield of acid is generally relatively low.

The relative proportions of the reactants can be varied although it has been found that aliphatic acids are obtained in optimum yields when the carbon monoxide is injected into the aqueous unsaturated hydrocarbon—carbon monoxide absorbent in substantially equal molal proportions. The concentration of the olefinic hydrocarbon may range, however, between 5% and 60% of the carbon monoxide injected into the aqueous absorbent, which composition will generally give a good yield when employed in the presence of a suitable catalyst.

The use of pressures in excess of atmospheric, say from 25 to 900 atmospheres, is preferred. The reaction proceeds over a wide range of temperatures, altho the optimum temperature varies with specific cases, depending inter alia, upon the unsaturated hydrocarbons being used. Generally, the desired reaction can be obtained at from 150° to 365° C. with a preferred range of from 200° to 300° C.

The following examples will illustrate methods of practicing my invention, altho it will be understood that the invention is not limited thereby:

*Example 1.*—A bomb, capable of withstanding elevated temperatures, was charged with 200 cc. of cuprous sulphate solution and 20 grams of pulverized copper. The copper sulfate solution was obtained by dissolving copper sulphate ($CuSO_4.5H_2O$) and sulfuric acid in water to give a solution containing 16% and 33% of these compounds, respectively. Ethylene was forced into the bomb until a pressure of 900 pounds per square inch was indicated and then carbon monoxide forced in until a pressure of 1400 pounds per square inch was indicated The bomb was then shaken for a period of 2 hours during which the temperature was maintained at approximately 145° C. The pressure reached a maximum value of 4000 pounds gauge. The aqueous solution was then treated with an excess of caustic potash filtered, concentrated, and finally distilled with an excess of sulfuric acid, by which method the propionic acid was separated from the other products of the reaction.

*Example 2.*—A reaction bomb was charged with 200 cc. of copper phosphate solution which was obtained by the addition of phosphoric acid and cupric phosphate to an aqueous solution to give a concentration of 25% $H_3PO_4$ and 8.6% cupric phosphate; 20 grams of finely divided copper was likewise added to the bomb. A pressure of 600 pounds per square inch of carbon monoxide was built up and subsequently ethylene added to give a total pressure of 1200 pounds per square inch. The resulting mixture was heated with shaking for 2 hours, the temperature being held at approximately 157° C., while the maximum pressure developed was in the neighborhood of 3300 pounds gauge. The propionic acid was separated in the manner described under Example 1.

*Example 3.*—A high pressure bomb was charged with 200 grams of copper sulfate solution prepared by dissolving copper sulfate containing 5 molecules of water crystallization and sulfuric acid in water to give 15% $CuSO_4.5H_2O$ and 9.3% $H_2SO_4$. Twenty grams of finely divided copper was likewise added to the bomb and then a pressure of 600 pounds per square inch was built up therein by the injection of ethylene and subsequent thereto carbon monoxide was injected to give a total pressure of 1200 pounds per square inch. The mixture was subsequently heated to approximately 200° C. and shaken for a period of 1½ hours, during which time a maximum pressure of 3400 pounds gauge was developed. The reaction product contained propionic acid and ethanol.

*Example 4.*—200 cc. of cuprous chloride solution, prepared by making a slurry with 3.5 kgs. of cuprous chloride in 2 liters of water to which are added 20 kgs. of hydrochloric acid, 1.19 sp. gr.; after shaking thoroughly the mixture is allowed to stand for three weeks prior to use,—was charged into a pressure bomb. Ethylene was then injected to give a pressure of 800 pounds per square inch and carbon monoxide then introduced to give a pressure of 1200 pounds per square inch. The mixture was then heated to 200° C. for a period of 1¼ hours, the maximum pressure reaching approximately 4000 pounds gauge. The product contained propionic acid and ethanol.

*Example 5.*—200 cc. of an ammoniacal cuprous chloride solution, obtained by dissolving 200 grams of cuprous chloride, 250 grams of ammonium chloride, and 250 cc. of concentrated ammonia in 750 cc. of water, were charged into a high pressure bomb. Ethylene was injected to give a pressure of 800 pounds per square inch and then CO to give a pressure of 1200 pounds per square inch. The mixture was subsequently heated to approximately 135° C. for a period of one hour. The product obtained contained a salt of propionic acid and ethanol.

*Example 6.*—200 cc. of copper sulfate solution obtained in a manner similar to its preparation in Example 3 except that $CuSO_4.5H_2O$ was made up to 28% and $H_2SO_4$ to 8% were charged into a pressure bomb with 20 grams of powdered copper. Ethylene was injected in an amount sufficient to give 800 pounds per square inch pressure; and carbon monoxide was then introduced to increase the pressure to 1200 pounds per square inch. The temperature of the mixture was raised to 158° C. and held at that temperature for a period of 1 hour. A maximum pressure of approximately 2300 pounds gauge was obtained and a product resulted containing propionic acid.

A number of catalysts other than those disclosed in the examples may be employed to accelerate the reaction and include generally inorganic acids such, for example, as arsenic acid, boric acid, and the like. Activated charcoal may be present with these acids, but preferably it is used with the strong inorganic acids, such as hydrochloric acid, sulfuric acid, phosphoric acid, and the like, which may be used conjointly with or without the addition of the metal salts corresponding to the acids employed. Such combinations as activated charcoal in a pulverulent form; hydrogen chloride and magnesium chloride as a composite catalyst appear to have a joint activity which is augmented by the conjoint use of these catalysts. The following catalysts may likewise be employed: calcium chloride, cadmium phosphate, silico-tungstic acid, zinc chloride, calcium chloride, calcium iodide, sodium bromide, potassium chloride, and in fact the majority of the catalysts which have been disclosed in the copending applications of Gilbert B. Carpenter and the applications of others showing various types of catalysts suitable for use in acid synthesis, such, for example, as the synthesis of acetic acid from methanol and carbon monoxide and the synthesis of propionic acid from ethylene, carbon monoxide, and steam in the vapor phase. Generally speaking, the catalysts adopted for the synthesis of acids are suitable for my liquid phase synthesis of aliphatic acids from the olefinic hydrocarbons, carbon monoxide, and water.

The apparatus, which may be employed for conducting these reactions, may be of any conventional type and is preferably one in which the temperature of exothermic reaction can be readily controlled at the desired value. Owing to the corrosive action of the acids produced, the interior of the converter and conduits leading thereto, particularly if the process is conducted in a continuous manner, should preferably be protected. This may be accomplished by using glass or glass-lined equipment, or by coating the inner surfaces of the apparatus with chromium or silver, or using for the construction of the equipment acid-resisting alloys of, for example, molybdenum, cobalt, tungsten, manganese, or nickel.

In the claims when reference is made to conducting the reaction in the liquid phase it will be understood that the water is in that phase, while the olefine and carbon monoxide may be in the vapor state.

From a consideration of the above specification, it will be realized that any process for the preparation of aliphatic organic acids in the liquid phase by the interaction of olefinic hydrocarbons, carbon monoxide, and water will come within the scope of this invention without sacrificing any of the advantages that may be derived therefrom.

I claim:

1. The process of producing aliphatic carboxylic acids which comprises reacting in the liquid phase an olefinic hydrocarbon, carbon monoxide, and water substantially in accordance with the equation:

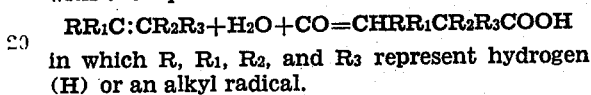

in which R, $R_1$, $R_2$, and $R_3$ represent hydrogen (H) or an alkyl radical.

2. The process which comprises reacting in the liquid phase an olefine, carbon monoxide, and water and thereby producing an aliphatic carboxylic acid.

3. The process which comprises reacting in the liquid phase ethylene, carbon monoxide, and water and thereby producing propionic acid.

4. The process which comprises reacting in the liquid phase propylene, carbon monoxide, and water and thereby producing butyric acid.

5. The process which comprises, reacting in the liquid phase, butylene, carbon monoxide, and water and thereby producing valeric acid.

6. A process of reacting in the liquid phase an olefinic hydrocarbon, carbon monoxide, and water and thereby producing an aliphatic carboxylic acid, characterized in that an excess of carbon monoxide over the olefine is introduced into the aqueous reaction bath.

7. A process of reacting an olefinic hydrocarbon, carbon monoxide, and water and thereby producing an aliphatic carboxylic acid, characterized in that the reaction is effected in the liquid phase and under a pressure within the range of 25 to 900 atmospheres.

8. A process of reacting an olefinic hydrocarbon, carbon monoxide, and water and thereby producing an aliphatic carboxylic acid, characterized in that the reaction is effected in the liquid phase and at a temperature within the range of 150 to 365° C.

9. In a liquid phase process for the preparation of aliphatic carboxylic acids by the interaction of an olefinic hydrocarbon, carbon monoxide, and water the step which comprises effecting the reaction in the presence of an aqueous solution selected from the group consisting of an aqueous copper salt solution and an aqueous mercury salt solution which under the conditions of the reaction absorbs the olefinic hydrocarbon and carbon monoxide.

10. In a liquid phase proces for the preparation of aliphatic carboxylic acids by the interaction of an olefinic hydrocarbon, carbon monoxide, and water the step which comprises effecting the reaction in the presence of an aqueous salt solution selected from the group consisting of an aqueous copper salt solution and an aqueous mercury salt solution in which under the conditions of the reaction, the salt forms a complex with the olefinic hydrocarbon and carbon monoxide.

11. In a liquid phase process for the preparation of aliphatic carboxylic acids by the interaction of an olefinic hydrocarbon, carbon monoxide, and water the step which comprises effecting the reaction in the presence of a copper salt solution adapted for absorbing olefinic hydrocarbons and carbon monoxide.

12. In a liquid phase process for the preparation of aliphatic carboxylic acids by the interaction of an olefinic hydrocarbon, carbon monoxide, and water the step which comprises effecting the reaction in the presence of an aqueous copper chloride solution adapted for the absorption of ethylene and carbon monoxide.

13. In a process for the preparation of aliphatic carboxylic acids by the reaction in the liquid phase of an olefinic hydrocarbon, carbon monoxide, and water the step which comprises effecting the reaction in the presence of an inorganic acid and the metal salt of an inorganic acid in sufficient amount to act as the catalyst for the reaction.

14. In a process for the preparation of aliphatic carboxylic acids by the reaction in the liquid phase of an olefinic hydrocarbon, carbon monoxide, and water the step which comprises effecting the reaction in the presence of an inorganic acid in sufficient amount to act as the catalyst for the reaction.

15. In a process for the preparation of propionic acid by the liquid phase reaction of ethylene, carbon monoxide, and water, the step which comprises effecting the reaction in an aqueous solution containing hydrogen chloride, magnesium chloride and pulverized activated charcoal.

ALFRED T. LARSON.